No. 617,312. Patented Jan. 10, 1899.
G. E. BELCHER.
SHOE STRETCHER.
(Application filed Dec. 15, 1897.)
(No Model.)

Witnesses:
Arthur F. Randall
Henry E. Holbrook

Inventor:
George E. Belcher,
by his attorney,
O. R. Mitchell.

UNITED STATES PATENT OFFICE.

GEORGE E. BELCHER, OF STOUGHTON, MASSACHUSETTS.

SHOE-STRETCHER.

SPECIFICATION forming part of Letters Patent No. 617,312, dated January 10, 1899.

Application filed December 15, 1897. Serial No. 661,921. (No model.)

*To all whom it may concern:*

Be it known that I, GEORGE E. BELCHER, of Stoughton, in the county of Norfolk and State of Massachusetts, have invented an Improved Shoe-Stretcher, of which the following is a specification, reference being had to the accompanying drawings, in which—

Figure 1:
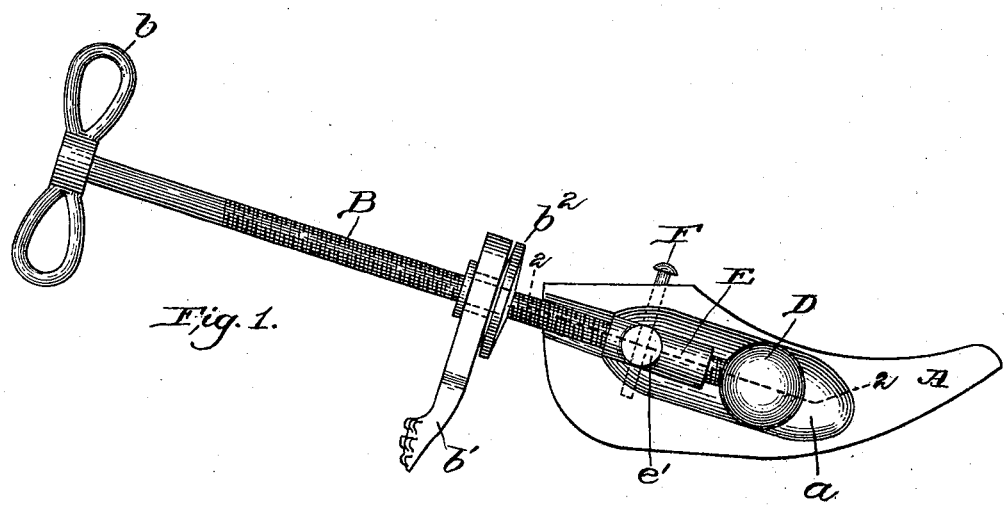
Figure 2:
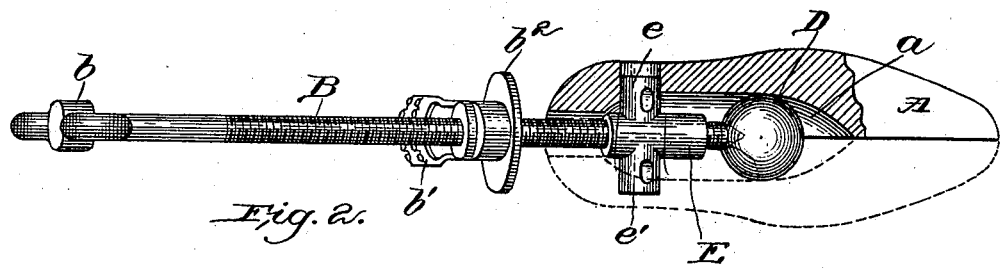
Figure 3:
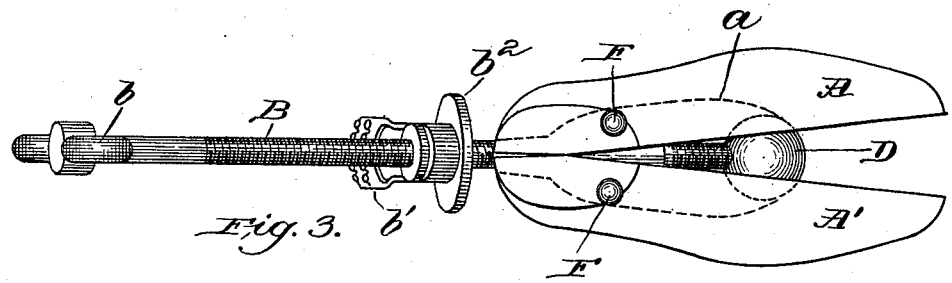

Figure 1 is a sectional elevation of my improved stretcher. Fig. 2 is a plan, partly in section, on line 2 2 of Fig. 1. Fig. 3 is a plan view showing the stretcher spread.

Stretchers in which the power is applied by means of a screw operating upon a wedge within the split last forming the stretcher to force the two parts of the last apart are old and well known; but in all such stretchers, so far as I know, the screw and the wedge have been merely loosely connected together, the screw turning independently of the wedge and bearing against it to push it forward and retracting it by means of the connection. The objection to this method of construction is that the point of the screw and the part of the wedge against which it bears in operation soon wear out and become unfit for further use, and this is also true of the parts connecting the wedge and the screw. These parts become distorted by the strain put upon them, and the instrument becomes useless. A further objection to this construction is the expense of making, and a further objection is that the wedge not infrequently gets out of its proper position in the wedge-slot and the user has difficulty in returning it to its place.

My improvement consists in substituting for the loosely-connected spreading mechanism of other stretchers a head fast to the end of the screw. This head may be V-shaped, elliptical, or semicircular in lengthwise shape—that is, in cross-sectional shape upon a lengthwise central section of the head. It must be circular in cross-section on a line across the length of the screw. The small or point end of the head is to the front and the head obviously turns with the screw, being, in effect, part of the screw-rod, and being of gradually-increasing diameter from front to rear it operates as a wedge, and this mode of operation, the head being circular in cross-section upon a line across the length of the screw, is not varied by the fact that it turns with the screw-rod.

It is clear that this improvement obviates the difficulty of wear between the end of the screw-rod and the rear of the wedge by making the wedge and screw-rod, in effect, one, and this is only possible by using a head circular in cross-section.

This improvement also obviates the expense of construction incident to the loose connection necessary to retract the common wedge and removes the connection as an element of wear and weakness in the stretcher, while the head used in my improved stretcher can be returned to its slot, in case it should come out, with the greatest ease.

In the drawings, A A' are the halves of the split last, and *a* the wedge-slot.

B is the screw-rod, *b* the handle for turning the screw-rod, and *b'* the thrust-piece, which is connected with the screw-rod by the screw-sleeve $b^2$, which turns upon the screw-rod to adjust the thrust-piece.

D is the head; E, the screw-rod barrel; *e e'*, the trunnions of the barrel, and F the pins which hinge the parts A A' of the last to the trunnions *e e'* and to each other.

In stretchers as heretofore made the screw-rod has worked in a screw-threaded aperture in a link by which the two halves of the last were connected at their rear ends. The necessary limitations of size of this connecting-link have made it impossible to get more than a few turns of screw-thread within the aperture, and in consequence of this the threads within the aperture have soon stripped off under the strain to which they were subjected in the use of the stretcher. To obviate this, I have made a barrel, which may be of any desired length and which is screw-threaded interiorly to receive the screw-rod. This barrel carries two trunnions *e e'*, which enter two holes, one in each of the two halves of the last at their rear ends, and which are pinned to the respective halves of the last by the pins F. The hole in the trunnions through which the pins pass is a slot longer in the direction of the trunnion than the diameter of the pins in order that the two halves may freely swing apart through the play thus allowed. In this way I provide screw-thread surface sufficient to resist the thrust of the screw-rod, however great may be the thrust it is exerting.

The mode of operation is as follows: The stretcher being closed is inserted into the shoe, and the thrust-piece $b'$ is adjusted within the counter at the proper position by means of the screw-sleeve $b^2$. The screw-rod B is then turned within the barrel E, causing the head D to be advanced toward the narrow fore part of its groove $a$, thus spreading the toe end of the last. (See Fig. 3.)

In the drawings I have shown the head as globular in form, as while it is only essential that the head be circular in section upon a line crosswise of the length of the screw I consider the globular form the best, inasmuch as this shape gives a perfect bearing between head and slot whatever the curve of the wedge-slot, the only effect of a change in the curve of the wedge-slot being that the contact-point of the head with the slot is shifted farther forward or backward, as the case may be. It will be obvious that only the forward half of the globular head is essential or ever comes in contact with the surface of the wedge-slot.

What I claim is—

1. The improved stretcher above described, made up of a split last, the two halves linked together at their rear ends and having a wedge-slot upon their inner faces; a screw-rod working in a bearing at the rear of the split last; a head circular in cross-section and of gradually-increasing diameter from front to rear secured upon the end of the rod and working within the wedge-slot, all combined and operating to cause the split last to be spread by the forward movement of the screw-rod.

2. The improved stretcher above described, made up of a split last, the two halves linked together at their rear ends and having a wedge-slot upon their inner faces; a screw-rod working in a bearing at the rear of the split last; a semiglobular head secured upon the end of the rod, its globular surface working in the wedge-slot, all combined and operating to cause the split last to be spread by the forward movement of the screw-rod.

GEORGE E. BELCHER.

Witnesses:
M. L. ANDREWS,
O. R. MITCHELL.